Figure 1:
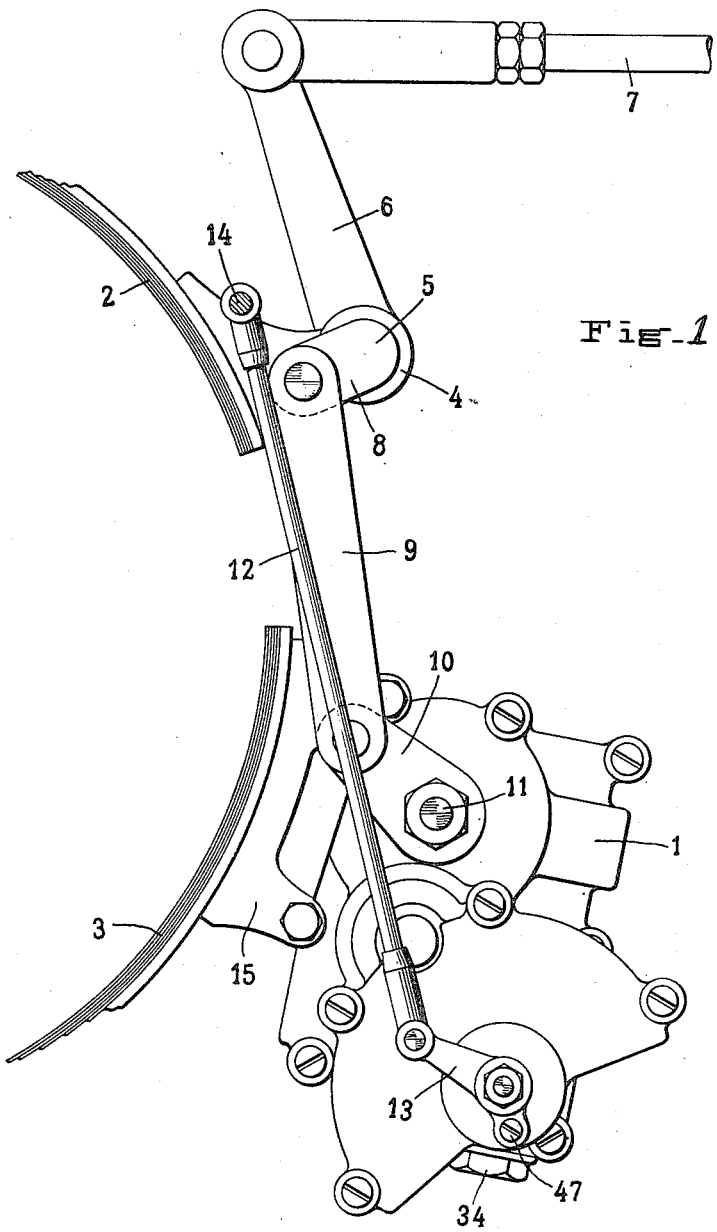

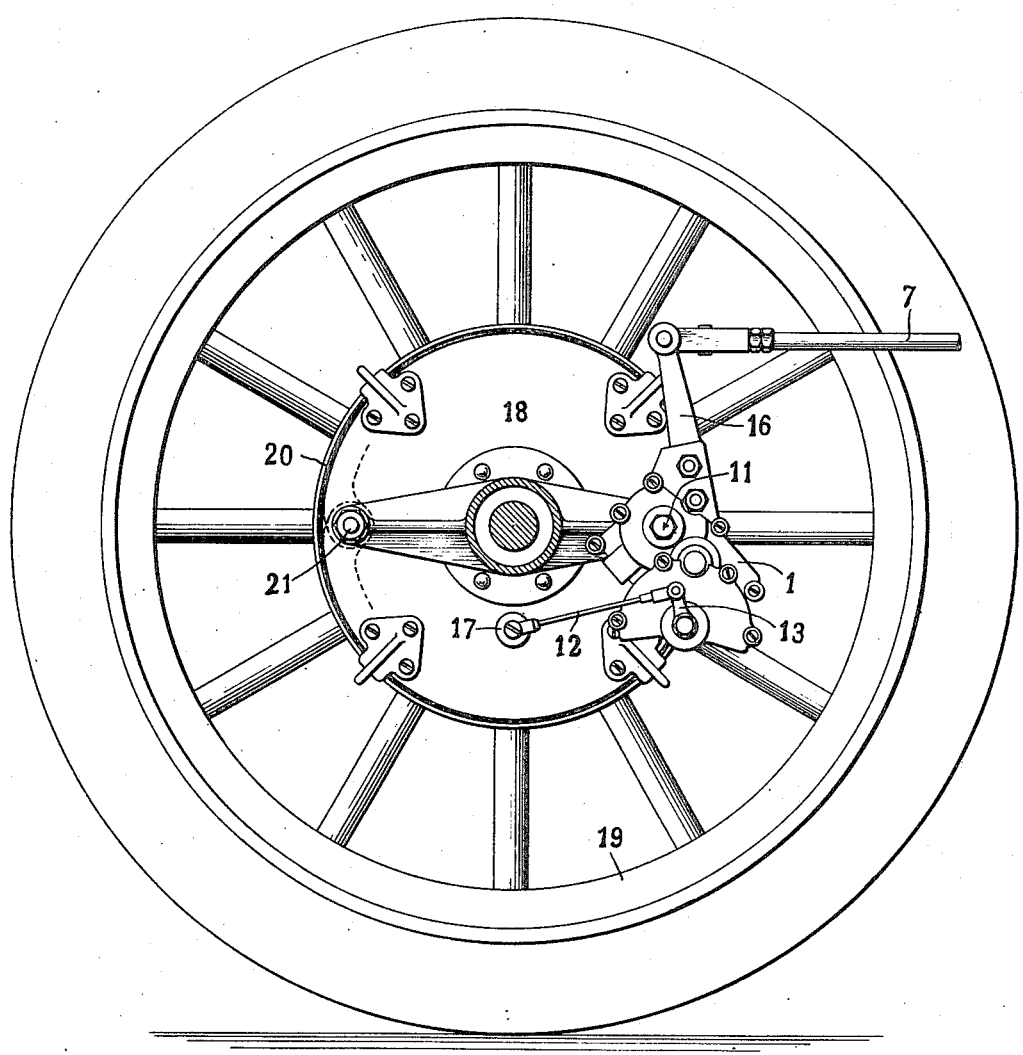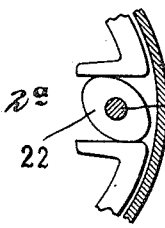

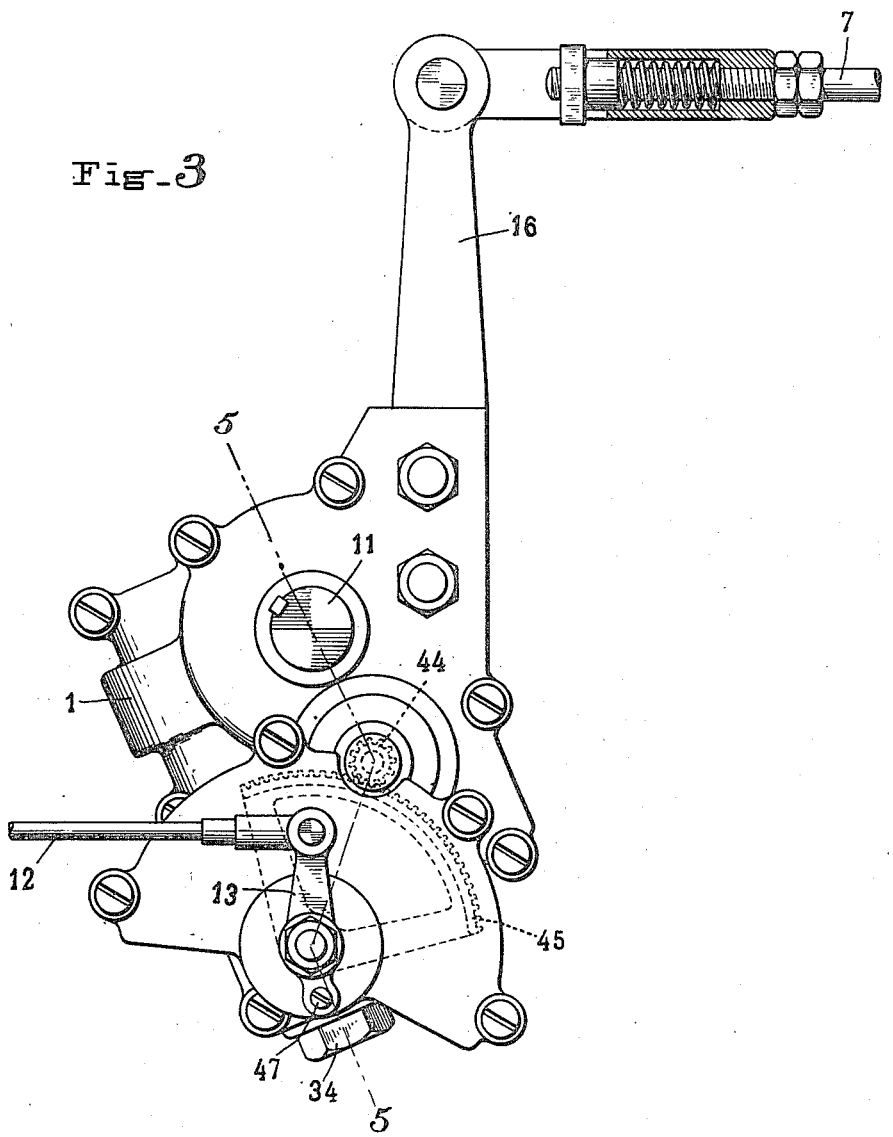

E. N. LUBURG.
SLACK ADJUSTER.
APPLICATION FILED MAY 6, 1914.
1,163,550.
Patented Dec. 7, 1915.
5 SHEETS—SHEET 4.
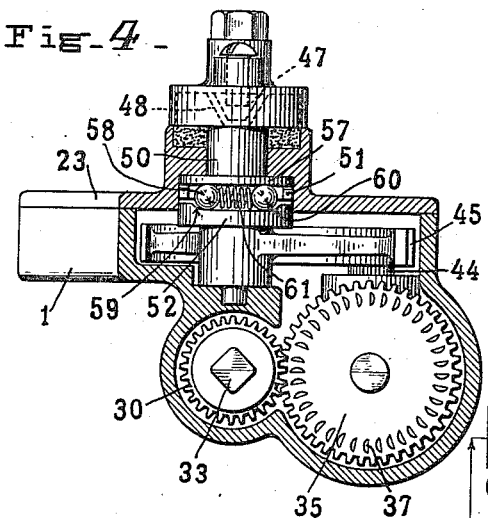
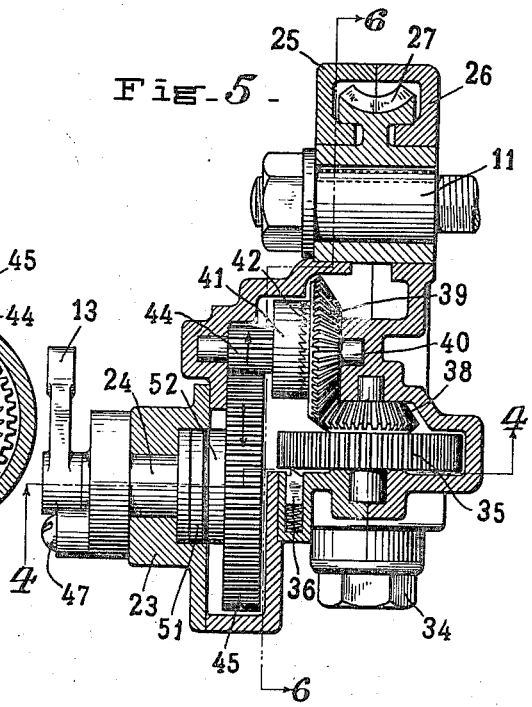
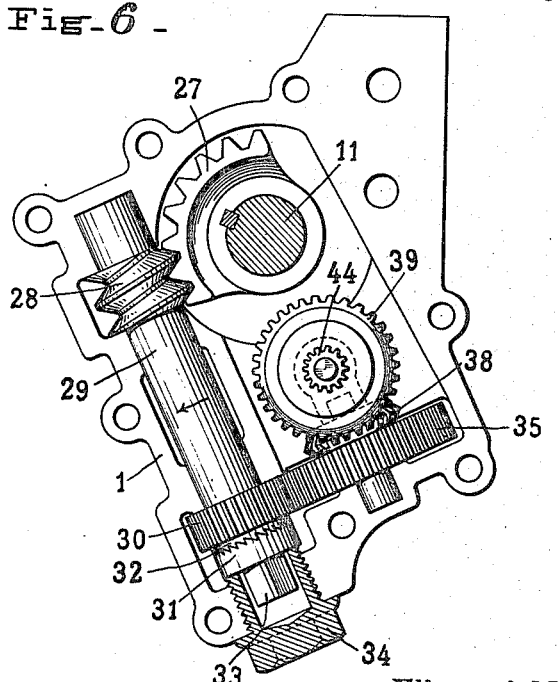
WITNESSES
INVENTOR
Ellsworth Nelson Luburg,
BY
ATTORNEY E. N. LUBURG.
SLACK ADJUSTER.
APPLICATION FILED MAY 6, 1914.
1,163,550.
Patented Dec. 7, 1915.
5 SHEETS—SHEET 5.
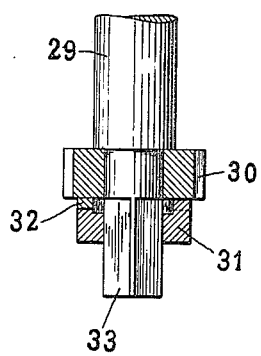
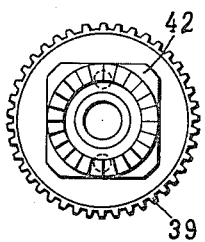
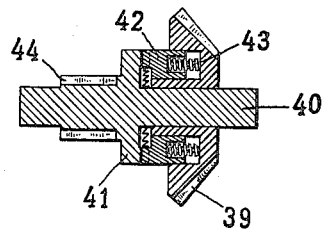
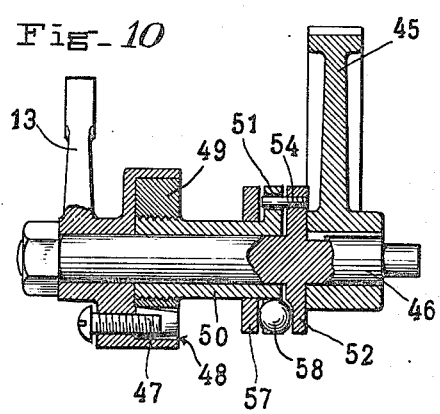
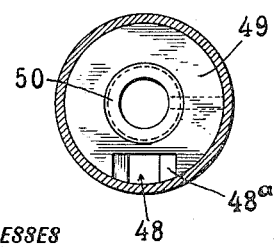
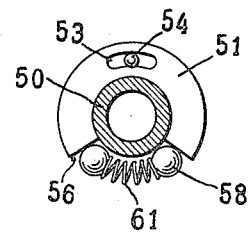
WITNESSES
INVENTOR
Ellsworth Nelson Luburg,
BY
ATTORNEY

UNITED STATES PATENT OFFICE.

ELLSWORTH NELSON LUBURG, OF ARLINGTON, MARYLAND.

SLACK-ADJUSTER.

1,163,550.

Specification of Letters Patent.

Patented Dec. 7, 1915.

Application filed May 6, 1914. Serial No. 836,788.

*To all whom it may concern:*

Be it known that I, ELLSWORTH NELSON LUBURG, a citizen of the United States, and a resident of Arlington, in the county of Baltimore and State of Maryland, have invented a certain new and useful Improvement in Slack-Adjusters, of which the following is a full, clear, and exact description, whereby anyone skilled in the art may make and use the same.

The invention relates to what is ordinarily known as slack adjusters, that is, a device for taking up slack in a mechanical device or mechanism which is induced by wear or elongation of the parts from any cause whatsoever.

It relates more particularly to an adjusting device applicable to brake mechanisms and is shown herein as applied to an automobile brake, this forming one of the best illustrations of its use and operation. It is not restricted in its use to brake mechanisms nor is it to be restricted to automobile brakes as it obviously may be used with very material advantage in connection with mechanical brakes or air brakes.

The object of the invention is to provide a device which, during the movement of the mechanism to which it is attached, will automatically adjust itself and said mechanism during the natural operating movements of said mechanism.

It is an object of the invention to compensate through the mechanism for any wear which may be occasioned by adjusting the mechanical parts of a mechanism subject to conditions of wear so that any wear or slack occasioned by the movement of the parts in one direction and under application and operation, will be immediately adjusted and compensated for by the return movement of the parts to a normal inoperative position.

It is the principal object of the invention to produce a device which, in its compensating or adjusting movements will adjust with precision and in direct ratio to the wear.

Referring to the drawings: Figure 1 is a view in side elevation of the device as it is applied to a brake band of the contracting type. Fig. 2 is a similar view on reduced scale of the device as applied to the cam or rock shaft of an expanding brake. In this application of the device, the adjusting rod is secured to a fixed stop on the casing. Fig. 2ª is a fragmentary view of the cam for expanding the brake shoes of the type illustrated in Fig. 2. Fig. 3 is a view on enlarged scale of the device illustrated in Fig. 2, with parts of the connecting rod broken away to show the spring clevice. Fig. 4 is a sectional view on the line 4—4 of Fig. 5. Fig. 5 is a sectional view on the line 5—5 of Fig. 3. Fig. 6 is a sectional view on the line 6—6 of Fig. 5. Fig. 7 is a detail view partially in section of the pinion and ratchet illustrated in Fig. 6. Fig. 8 is a detail rear face view of the bevel, gear and ratchet illustrated in Fig. 5. Fig. 9 is a longitudinal section of the bevel, gear, ratchet, pinion and shaft. Fig. 10 is a detail view in section of the adjusting shaft segment. Fig. 11 is a detail view of the adjustment for the adjusting lever illustrated at the left of Fig. 10. Fig. 12 is a detail view of the stop disk and clutch at the right of Fig. 10.

It has not been an uncommon practice to employ adjusting devices for automatically taking up slack to a certain degree which may occur in brake rods and like devices which are used for applying brakes. By slack is meant the excess movement required on the brake lever and its connecting rod to bring the brake shoes or movable element of the braking device up to its set braking position with the coöperating brake drum or similar member.

It is one of the principal objects of the present invention to provide a device which, with a single movement of the lever and brake rod or analogous parts will secure a positive and perfect adjustment, taking up exactly the amount of excess movement of said mechanism which has been permitted by the wear of the parts. As an instance, a connecting rod between the brake band and a brake lever must have a free play or movement equal to the movement required to move the brake band from its slack or open position to its full " on " position in contact with the coöperating brake members. This movement should always remain fixed to secure the best results and provide against drag of the brake shoes or bands. Obviously, upon wearing of the brake drum or brake bands during the application of the brake, the brake rod, on an application of the brake bands, will move through a greater lineal distance. The invention herein described contemplates the immediate adjustment of said brake rod to always maintain a fixed minimum movement of the rod in applying the brakes and if wear is occasioned, as the brake is applied, during the forward movement of the brake rod or any movement in applying the brakes, that wear will be immediately compensated for by a shortening of the connections or a re-adjustment of the braking elements to always maintain the brake rod in its "on" and "off" position within fixed limits. This fixed limit, being the initial movement permitted for freeing the brakes.

It is a matter of indifference whether the adjustment is effected by a shortening of the brake rod itself or by an adjustment of the mechanism which applies the band or shoes of the brake to the drum or braking surface. In co-pending applications, Serial No. 752,414 filed March 6, 1913 and Serial No. 682,910, filed March 11, 1912 I have described a mechanism for shortening the connecting or brake rod always in exact ratio to its excess movement due to wear. In the device herein described, I show a mechanism which may be applied directly to the braking devices and in a measure taking the place of the ordinary brake lever which operates cams, toggles or other devices for applying the brake bands or brake shoes to the brake drum or wheel. This device when used, giving an accurate and determinate adjustment for each brake, obviates the necessity of utilizing equalizing bars between brakes when used in multiple relation on different wheels.

In the accompanying drawings in Fig. 1, the device is shown as applied to a contracting brake such as is commonly employed on the exterior of a brake drum, while in Fig. 2 the mechanism is illustrated as applied to an internal brake. The mechanism inclosed within the casing 1 in either case is of the same form and is hereinafter described in detail. It will be noted that the only difference in the two applications of the device illustrated in Figs. 1 and 2 resides in the arrangement of the exterior connection.

In Fig. 1 the numeral 2 denotes one side of a brake ring or band and 3 the adjoining side. The side or end 2 is provided with a rocker support 4 in which is pivotally arranged a rocker arm 5, one side of which terminates in the brake lever arm 6 which is connected to the brake rod 7 that is connected forward with any suitable brake lever. One end 8 of a rocker arm is connected through a link 9 with an arm 10 which is fast upon the main adjustable shaft 11 which, as hereinafter described in detail, changes its position and varies the position of the arm 10, connecting link 9 and rock arms 8 and 6 whenever any excess movement of the brake rod 7 has taken place, such as might be due to wear of the brake band 2, 3, which would permit slack when the brake band was released. The numeral 12 denotes an adjusting bar which at one end is connected with an adjusting lever 13 and at its opposite end is suitably connected as at 14 with any fixed point adjacent to the end 2 of the brake band. It will be noted that the device is merely hung upon one side 3 of the brake band as by being secured to the bracket 15 and the usual links and brake connections ordinarily attached to the opposite end of the brake band are connected to the device through the lever 10.

In Fig. 2 the main adjustable shaft 11 represents the end of the tappet or cam shaft of an internal brake which projects through the casing and mechanism, said casing and mechanism having an extended arm 16 which takes the place of the ordinary brake lever arm such as 6 which is illustrated in Fig. 1. In the case of Fig. 2, the adjusting lever 13 is connected through the rod 12 exactly as in Fig. 1 with a fixed stop 17 shown as a stud projecting from the brake housing 18 of the wheel 19. The wheel 19 shows the more modern type of brake structure in which the brake shoes are arranged within a drum 20 and pivotally hung to a fixed bracket as at 21 with their free ends arranged to be expanded by a cam 22, the shaft of which is illustrated as the shaft 11, projecting through the adjusting mechanism hereinafter described in detail. The adjusting device has all of its main parts arranged within a three-part casing consisting of a capped part 23 which forms a bearing for an adjusting shaft 24 and the main split casing 25, 26, which incloses the mechanism and is provided with an extended arm 16 illustrated in Figs. 2 and 3. Within the casing is arranged a worm-gear 27 which has a substantial bearing in the casing and is arranged to be fitted over and secured to the tappet shaft 11 and applied as in Fig. 2 or to the shaft 11 of Fig. 1, which bears the short lever 10.

When arranged as illustrated in Fig. 2, the tappet shaft 11 is keyed to the spiral or worm gear segment 27 and this segment meshes with a worm 28 preferably formed integral with a worm shaft 29 which, adjacent to its lower end, is provided with a pinion 30 loosely mounted upon the shaft 29 but locked thereto by a toothed member 31 which engages a toothed member 32 fast on the pinion 30. The member 31 is provided with a squared opening which fits over the squared end 33 of the shaft 29 and the toothed members are held in locked position by a tubular nut 34 which is screwed into the lower end of the casing. Upon removal of the tubular nut 34, the toothed member 31 will drop away from its engagement with the member 32 and by applying a wrench to the squared end 33, the worm shaft 29 may be turned to rotate the segment 27 and tappet shaft 11. This is only done in re-adjusting the device after it is compensated for wear. Such an adjustment is used when applying new brake shoes or re-lining the brakes. The pinion 30 meshes with a gear 35 which is held against movement in one direction by a spring detent 36 which engages teeth 37 formed on the under side of the gear. This gear 35 is secured to a beveled pinion 38 which is mounted upon the same shaft as the gear 35. The beveled pinion 38 meshes with a beveled gear 39 which is loosely mounted upon a shaft 40 which shaft has a hub 41 provided with ratchet teeth arranged to engage ratchet teeth formed upon a member 42 which slides within the rear face of the beveled gear 39. Springs 43 normally hold the ratchet teeth in engagement. The ratchet member 42 is squared or may be of any angular formation and fits a recess of a similar form in the rear of the gear 39. The shaft 40 also bears fixed thereon a pinion 44 which meshes with the segmental gear 45 and this segmental gear 45 is keyed to the adjusting shaft 46 which bears the adjusting lever 13. The adjusting lever 13 is normally loose upon the shaft 46 and at all times may have a limited movement with reference thereto dependent upon the position of an adjustable stop which consists of a screw 47 passing through an extension at one side of the axis of the lever 13 and adjustably arranged with reference to the beveled opening 48 formed through a ring 49 fixed with reference to a sleeve 50. The sleeve 50 is provided at one end with a disk 51 best illustrated in Figs. 10 and 12 and opposed to said disk 51 is a disk 52 fast upon the shaft 46. The disk 51 is slotted as at 53 and a pin 54 projects from the disk 52 into said slot. Said disk 51 is cut away as at 56 so that a recess is formed between said cut away portion and between the disk 52 and a thrust washer 57 to receive a pair of clutch balls 58. The disk 52 is provided with cam surfaces 59, 60 which are engaged by the clutch balls 58, said balls being normally held against their clutch faces by an intermediate spring 61. It will be observed that the beveled opening 48 in the collar 49 provides, in conjunction with the pin 47, for various adjustments to permit a free movement of the lever 13. This free movement of the lever 13 is to permit a movement of the main brake rod such as is required to move the braking parts from the "off" to the "on" position and obviously, this may be varied to suit the exigencies of any particular case so that the device is applicable to any brake mechanism by being properly adjusted and there will be no adjusting movements of the parts until the brake rod has exceeded the ordinary movement of the brake rod required to apply the brake.

The operation of the parts above described is identical in any application of the device which operates as follows: With the adjusting lever 13 having a permissible free movement, the brake lever 16 may, upon a pull of the brake rod 7 rock the device and the tappet shaft 11 and no motion will be transmitted to or through the various gears in train with the adjustable worm gear segment 27. As soon as wear occurs upon the brake shoes or appurtenant parts, it is obvious that the brake rod 7 will move forward a greater distance than is normally permitted by a free movement allowed the adjusting lever 13 through its adjusting screw 47 and the beveled slot or opening 48. This will rock the device upon the shaft 11 to an abnormal extent and the movement will increase so long as the brake shoes or analogous parts continue to wear. This excess movement will be communicated to the segmental gear 45 in the following manner. The adjusting lever 13 being connected to a fixed stop by its rod 12 permits the normal oscillation of the device on its main shaft 11 until the pin 47 brings up against one side 48ª of the slotted opening 48 of the ring 49. Thereupon the sleeve 50 will be rotated until the disk 51 moves one of the balls 58 away from the cam surface 60. One end of the slot 53 now engages the pin 54 and rotates the shaft 46 with its segmental gear 45. The rotation of the gear 45 rotates the pinion 44 in the direction illustrated by the arrow in Fig. 5 and slips the ratchet teeth of the member 41 with reference to the ratchet teeth of the member 42 without turning the gear train 39, 38, 35, 30, 28 and 27. When the brake rod is released after its excessive movement, the return oscillating movement of the device will cause a locking of the adjusting lever 13 with reference to the segmental gear 45 and thereupon said gear will transmit movement to the pinion 44 in a reverse direction from that indicated by the arrow in Fig. 5 and thereupon the beveled gear 39 will rotate the beveled pinion 38 and spur gear 35 which in turn rotates the pinion 30, worm shaft 29 and worm 28 and thus rotates the segmental worm gear 27. This obviously will change the position of the tappet shaft 11 by rotating it and will compensate for the excess movement of the brake rod 7 and connected parts. This adjusting will take place until the brake parts are completely worn out and there will always be exactly the same slack or lost movement for the "off" and "on" position of the brake. When it is desired to renew the brake shoes or linings of the brakes, the tubular cap nut 34 is removed from the casing and the key is applied to the squared end 33 of the worm shaft 29. This shaft may then be turned to rotate the worm gear 27 back to its initial position illustrated in Fig. 6. During the rotation of this shaft toward the left, the ratchet member 31 is out of engagement with the coöperating member 32 and therefore no motion is transmitted to the gear 35 and the train of gears connected therewith.

The proportioning of the gear trains is such that the excess movement of the parts due to wear on the application of the brake is compensated for exactly by a backward rotation of the device upon a rearward movement of the brake rod and connected parts. It is obvious from this that a constant clearance will always be maintained for the brake mechanism. The whole device is applicable as a unit to the tappet shaft or rock shaft when used as illustrated in the drawings and during the application of the brakes rocks the tappet shaft of Fig. 2 or the brake arm 10 of Fig. 1 exactly as the ordinary connecting lever would do. Upon the reverse movement of the brake rod, if any wear has taken place, the tappet shaft is rotated to an exact degree to compensate for the excess movement occasioned by the wear and thus the minimum amount of loose play, lost movement, or such movement as is required to fully relieve the brakes, is always maintained within fixed limits, no matter how much the parts may wear.

Obviously, the exact details of the mechanism might be varied to a considerable extent without departing from the spirit or intent of the invention and of course the device might be applied to the adjustment of any mechanism where it is desired to maintain a fixed constant of free movement and compensate for excess movements due to wear and similar causes.

What I claim as my invention and desire to secure by Letters Patent is:

1. A slack adjuster comprising a casing and support, an adjustable shaft mounted therein, as oscillatory adjusting shaft, a gear train intermediate said shafts and normally locking the adjustable shaft against movement with reference to the casing and support, means for permitting free oscillation of the adjusting shaft in one direction and means for locking said shaft and gear train for rotating the adjustable shaft when the oscillating shaft is moved in the opposite direction.

2. A slack adjuster comprising a casing and support, an adjustable shaft, a worm gear and worm for moving said shaft, an oscillatory adjusting shaft, a gear train intermediate said shaft and worm, clutch devices permitting a free oscillation of said oscillatory shaft in one direction without transmitting movement to the worm and means for transmitting movement of said oscillatory shaft to the worm for rotating the adjustable shaft during oscillation in the opposite direction.

3. A slack adjuster comprising a casing, an adjustable shaft normally locked with reference to said casing, a worm and worm gear for rotating said shaft, a gear train connected with said worm, an oscillatory shaft connected with the gear train, a lever for actuating said shaft and clutch devices permitting a free movement of the lever in one direction and locking said lever to the gear train to move the latter during oscillation in the opposite direction.

4. A slack adjuster comprising a casing, an adjustable tappet shaft extending therethrough and normally locked against movement with reference to the casing by a gear train, a gear train adapted to rotate said tappet shaft, an adjusting shaft operatively connected with said gear train, clutch devices permitting an oscillation of said shaft in one direction without transmitting movement to the tappet shaft and devices for locking said shaft and gear train to rotate the tappet shaft during an oscillation of the adjusting shaft in the opposite direction.

5. A slack adjuster comprising a casing, a rotatable adjustable shaft mounted therein, a gear train for rotating said shaft, an oscillatory adjusting shaft connecting with the gear train, a lever for oscillating said shaft, said lever having a free movement with reference to the shaft, means for adjusting the degree of said movement, clutch devices permitting movement of the oscillatory shaft in one direction with the adjustable shaft immovable and devices for clutching the lever shaft and gear train for rotating the adjustable shaft during oscillation of the adjusting shaft in the opposite direction.

6. A slack adjuster comprising a casing, an adjustable shaft mounted therein, a worm gear segment secured to said shaft, a worm meshing with said gear segment, an oscillatory adjusting shaft, a gear train intermediate said shaft and worm for rotating said worm during oscillation of the adjusting shaft in one direction, clutch devices permitting free oscillation of the shaft with reference to the worm and means for oscillating the adjusting shaft.

7. In a slack adjuster embodying an adjustable shaft and an oscillatory adjusting shaft, a lever for oscillating the latter, a disk borne upon the oscillatory shaft and provided with a beveled perforation, an adjustable pin arranged upon the lever and projecting into said perforation, said pin and beveled opening determining by their relative position the free movement of the lever with reference to the shaft.

8. In a device of the character described embodying an adjustable shaft and an oscillatory adjusting shaft with an intermediate gear train for moving the former upon certain movements of the latter, a segmental gear mounted upon the oscillatory shaft, a clutch disk operatively arranged with reference to said gear and shaft, a sleeve loose upon the shaft and having a disk for controlling the clutch of the clutch disk and a lever for moving the shaft and gear, said lever having a predetermined free play with reference to the sleeve and clutch disks.

9. A slack adjuster comprising a casing and adjustable shaft mounted therein and an oscillatory adjusting shaft, a gear train connecting said shafts and including a worm gear, worm and worm shaft, automatic means for rotating the worm shaft through the gear train and means for disconnecting said worm shaft from the gear train to permit manual rotation of the worm and worm gear.

ELLSWORTH NELSON LUBURG.

Witnesses:
  N. EDWARD KIRK,
  CHAS. HOFFMAN.